US005745112A

United States Patent [19]

Hirose

[11] Patent Number: 5,745,112
[45] Date of Patent: Apr. 28, 1998

[54] DEVICE AND METHOD FOR A WINDOW RESPONDING TO A DRAG OPERATION

[75] Inventor: Shin-ichi Hirose, Tokyo-to, Japan

[73] Assignee: International Business Machine Corp., Armonk, N.Y.

[21] Appl. No.: 573,173

[22] Filed: Dec. 15, 1995

[30] Foreign Application Priority Data

Dec. 16, 1994  [JP]  Japan .................... 6-313058

[51] Int. Cl.⁶ .................................. G06F 3/00
[52] U.S. Cl. ............................ 345/349; 345/343
[58] Field of Search ................. 395/326–358; 345/117–120, 146, 902, 326–358, 145

[56] References Cited

U.S. PATENT DOCUMENTS 5,140,677  8/1992  Fleming et al. ............... 395/349
5,422,993  6/1995  Fleming ...................... 395/348 X
5,491,784  2/1996  Douglas et al. ............... 395/348 X
5,530,865  6/1996  Owens et al. ................. 395/348 X
5,546,527  8/1996  Fitzpatrick et al. ........... 395/348 X
5,548,702  8/1996  Li et al. ..................... 395/348 X
5,606,674  2/1997  Root .......................... 395/346

*Primary Examiner*—John E. Breene
*Attorney, Agent, or Firm*—A. Bruce Clay

[57] ABSTRACT

A method and system that improve direct manipulation operations in a multiwindow environment. Whenever the system detects the start of a drag operation, attribute information on the dragged object is sent to the windows displayed in the system. Each window determines from the attribute information whether or not it can respond to the drag operation. The display is disabled for any window that determines it cannot respond to he drag operation.

22 Claims, 7 Drawing Sheets

DEVICE AND METHOD FOR A WINDOW RESPONDING TO A DRAG OPERATION

FIELD OF THE INVENTION

The present invention relates to a system and method for improving a user interface for direct manipulations in an operating system that primarily operates in a multiwindow environment.

DESCRIPTION OF THE PRIOR ART

The recent improvement of computers and the recent popularity of personal computers and workstations are increasingly urging the common use of systems with a multitask multiwindow operating system such as OS/2 (a trade mark of IBM) or Windows (a trade mark of Microsoft).

All these operating systems use a graphical user interface (GUI) that uses pointing devices such as windows, icons and a mouse to improve the user's operability. These operating systems can instruct a move, copy, or delete operation, or the activation of a program by hooking a cursor on an icon to move and place it onto another icon or a window (a drag-and-drop operation).

The window refers to part of a screen such as 301, 302, or 305 in FIG. 3, and contains several icons and menus or other control functions. The icon refers to a small graphic image such as 303, 304, or 309 in FIG. 3 which is displayed on a window, and represents an object that can be operated by the user.

Assume an operation of "deleting a text file named A. TXT using a shredder icon".

FIG. 3 shows a conventional method, which searches for an icon named A. TXT on the screen. This icon is displayed as A. TXT 303 within a text window (or a folder) 302 in FIG. 3.

An icon for deleting this text file, that is, the shredder icon must then be found. The shredder icon, however, cannot be seen in FIG. 3 because it is hidden behind a clock window 305, as shown in FIG. 4. The user then iconize the clock window 305 to enable the shredder icon to be seen on the screen while moving the window to a position (the lower left of FIG. 4) in which it will not interfere with the shredder icon 306. FIG. 4 shows the results of the iconization and movement. FIG. 4 also shows that the shredder icon 306 that will be used to perform the target operation can now be seen on the screen. A broken line 307 surrounding the shredder icon 306 is shown for convenience in the position originally occupied by the clock window 305 in FIG. 3, and is not displayed in operating systems that use normal windows.

Preparation for the deletion of the text file A. TXT has thus been completed by the user performing the above operation.

As shown in FIG. 5, the user then uses a pointing device such as a mouse to drag (move) the text file A. TXT 303 onto the shredder icon 306 and then drops it thereon. This is the drag-and-drop operation. The text file A. TXT 303 is then deleted by the shredder icon from a memory (206 or 210) of the computer, and the icon 303 is thus removed from the screen.

As shown in the above example of the deletion of a text file with the shredder icon, the drag-and-drop operation in conventional window systems requires the following complicated operations (steps).

1) Search for an icon A to be processed (for example, a text file).
2) Search for an icon B that can probably process the icon A (for example, the shredder icon).
3) If the icon B is not being displayed or is hidden behind another window, move or minimize the unwanted window and icons to reveal the icon B.
4) Drag the icon A to be processed onto the icon B that can probably process the icon A.
5) If the icon B can process the icon A, drop the icon A onto the icon B to finish the desired processing. Otherwise, abandon the desired processing or search for another icon that can process the icon A.
6) Return the display screen to the state prior to the start of the above sequence of operations (steps).

It is thus the object of this invention to improve user interfaces by eliminating the complicacy associated with direct manipulations.

SUMMARY OF THE INVENTION

The following two means are added to the ordinary drag-and-drop or direct manipulation mechanism to implement the present invention: a first means (step) used when the system senses the start of dragging, for requesting attribute information on the type of the dragged icon from the window on which that operation has been initiated, and transferring the attribute information and the start of dragging to other windows, and a second means (step) for allowing each window to determine based on the transferred attribute information whether or not it can respond to the dragging operation and if so, to display itself. This eliminates the need of the operation 3) of the above sequence of operations described above in the background art.

DESCRIPTION OF THE PREFERRED EMBODIMENT

Embodiments of this invention are described below in the following order with reference to the drawings.

A. Hardware configuration
B. System configuration
C. Embodiment 1
D. APIs for OS/2
E. Modifications to the DrgDrag function
F. Modifications to the window procedure
G. Embodiment 2
H. Embodiment 3

A. Hardware configuration

Figure 1:
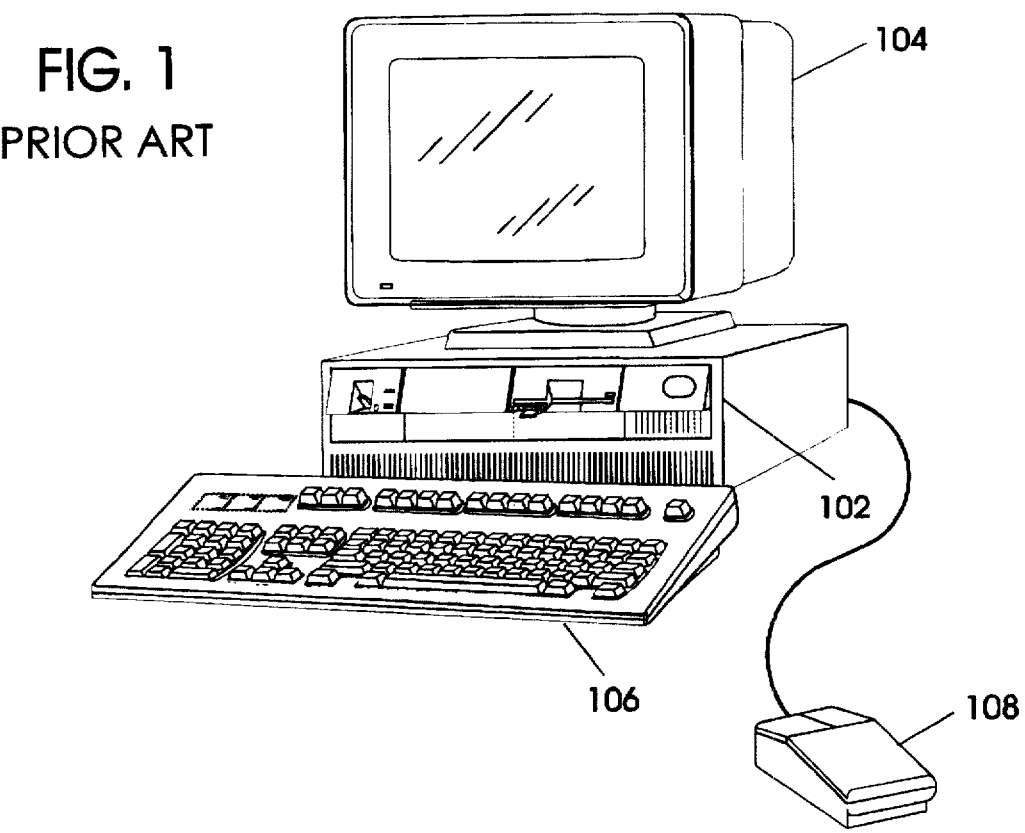
FIG. 1 is a perspective view of personal computer.

Referencing FIG. 1, a hardware configuration for implementing this invention is shown. This configuration has a system device 102 for storing a CPU, a RAM, a ROM, a hard disk, a diskette drive, and various control ports, a CRT device 104 preferably having an APA (all points addressable) color bit map display capability that equals to a resolution of 640×480 dots or more, a keyboard 106 for enabling commands and characters to be input to the system device 102 using keys, and a mouse 108 that is an example of a pointing device used in direct manipulations for pointing to an arbitrary point on the display screen of a CRT device 104 to input the coordinate values of the arbitrary point to the system device 102.

B. System configuration

Figure 2:
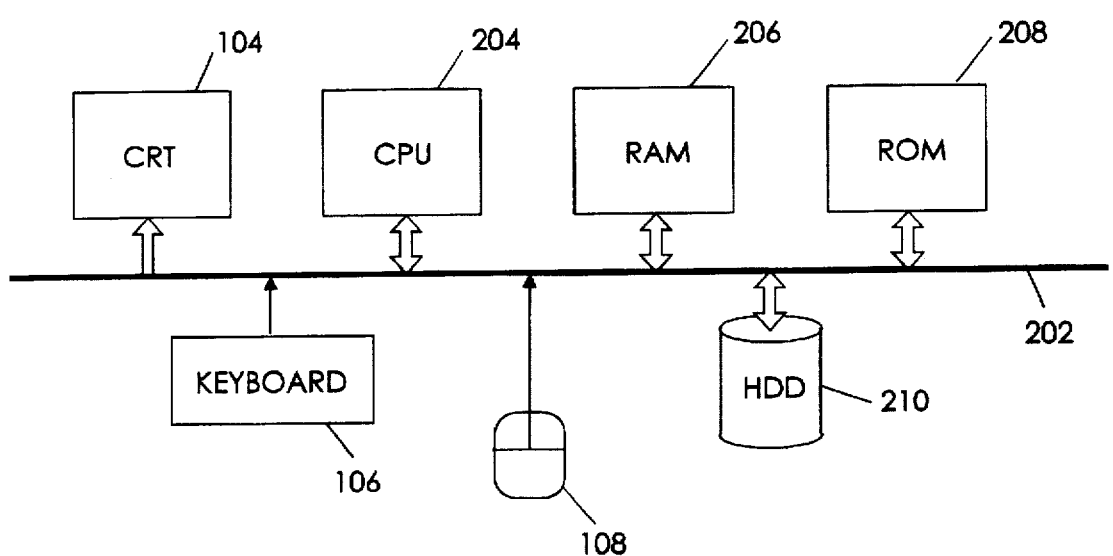
FIG. 2 is a block diagram of a system configuration according to the present invention.

Referencing FIG. 2, a block diagram of system components constituting the hardware in FIG. 1 is shown. In FIG. 2, a bus 202 is connected to the CRT device 104, keyboard 106, and mouse 108 shown in FIG. 1. The bus 202 is also connected to a processor device (CPU) 204 for carrying out mathematic operations and I/O control processings. The CPU 204 may be a general CPU such as Power PC 601, 603 commercially available from IBM or x86 commercially available from Intel, for example, 80486. No special functions of CPU are required to implement this invention.

The bus 202 is also connected to a random access memory (RAM) 206 for providing a main storage for loading an operating system and application programs, a read only memory (ROM) 208 in which a BIOS including IPL and basic I/O routines is stored in a nonvolatile manner, and a mass hard disk drive (HDD) 210 that stores an operating system and various application programs such as tabulation programs, databases, a word processor, and a text editor in a nonvolatile manner and has a swap region for a main storage to provide a virtual storage function adopted in most current operating systems.

The operating system stored in the HDD 210 is, in this embodiment, OS/2 (a trade mark of IBM), but may be Windows (a trade mark of Microsoft) or X-Window System (a trade mark of MIT). Although the operating system that can be used for this invention is not limited to these operation systems, it preferably has a bit map display function and more preferably supports a multiwindow environment.

The operating system preferably has API functions for providing typical functions required for window, icon, and mouse operations, such as Presentation Manager (PM) in OS/2. Typical operating systems that meets this condition include Windows and X-Window System.

C. Embodiment 1

Figure 6:
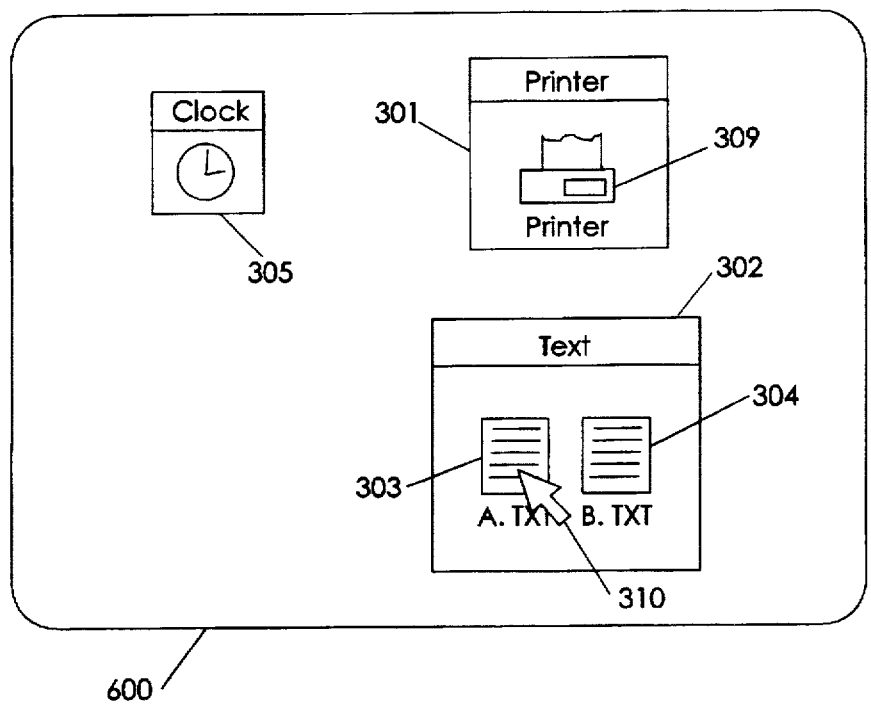
FIG. 6 illustrates a second example of a drag and drop operation according to the present invention.
Figure 7:
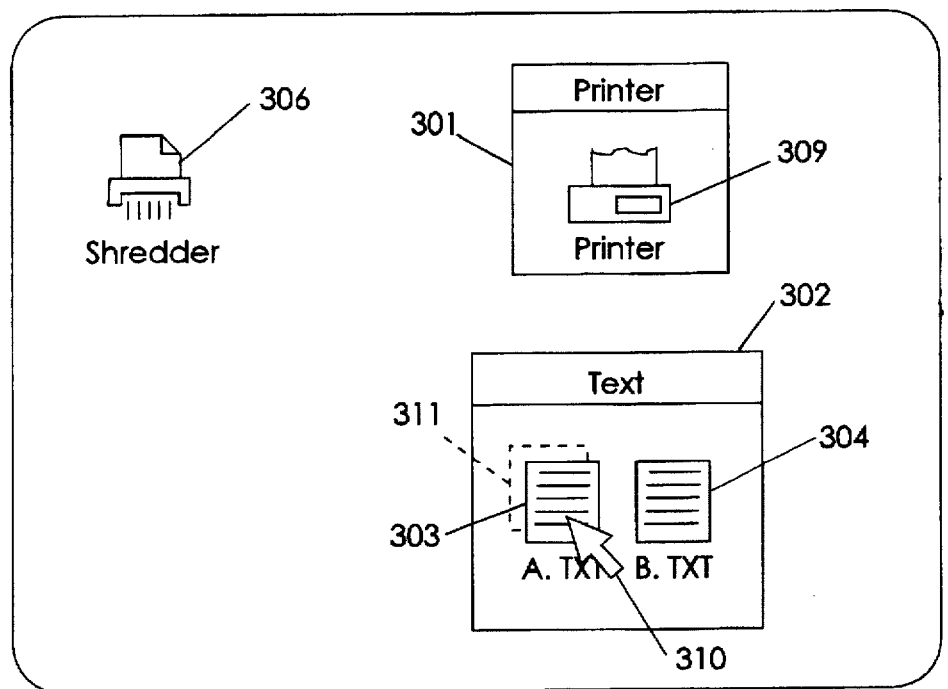
FIG. 7 illustrates a third example of a drag and drop operation according to the present invention.

Referencing FIGS. 6 and 7, an embodiment of this invention is described. First, FIG. 6 shows a view similar to that in FIG. 3. A screen (desktop) 600 shows the display region of the CRT device 104. 301, 302 and 305 shows a printer, a text and a clock, respectively. Each window usually contains one or more object icons. For example, a printer window 301, a text window 302, and a clock window 305 contain a printer icon, text file icons named A. TXT and B. TXT, and a clock icon, respectively. Each of these icons is a graphic or pictograph representing the contents of a file or the function of a program. With these icons, the user can specify a file without inputting a program or command name from the keyboard as in conventional character user interfaces (CUIs) by selecting from the icons displayed on the screen using the mouse.

Figure 3:
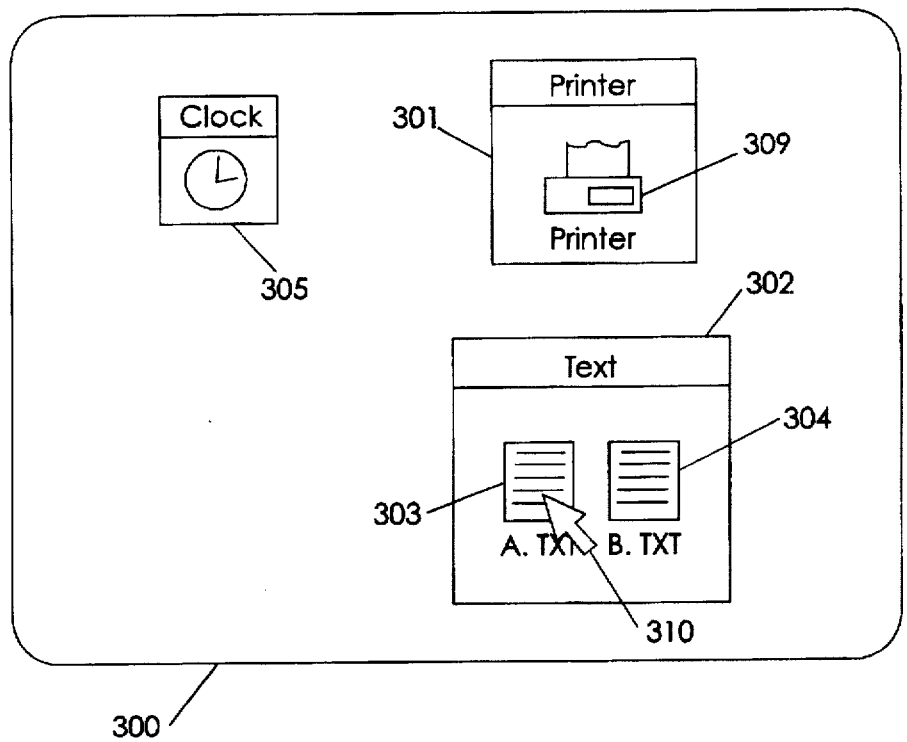
FIG. 3 illustrates an example of a conventional drag and drop operation.
Figure 4:
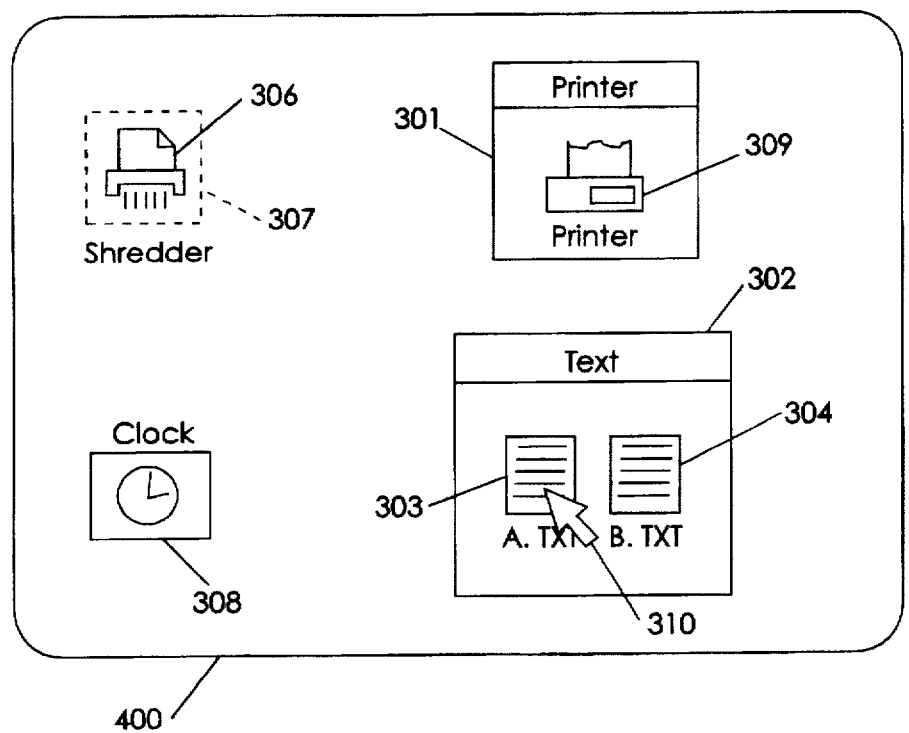
FIG. 4 illustrates a second example of a conventional drag and drop operation.
Figure 5:
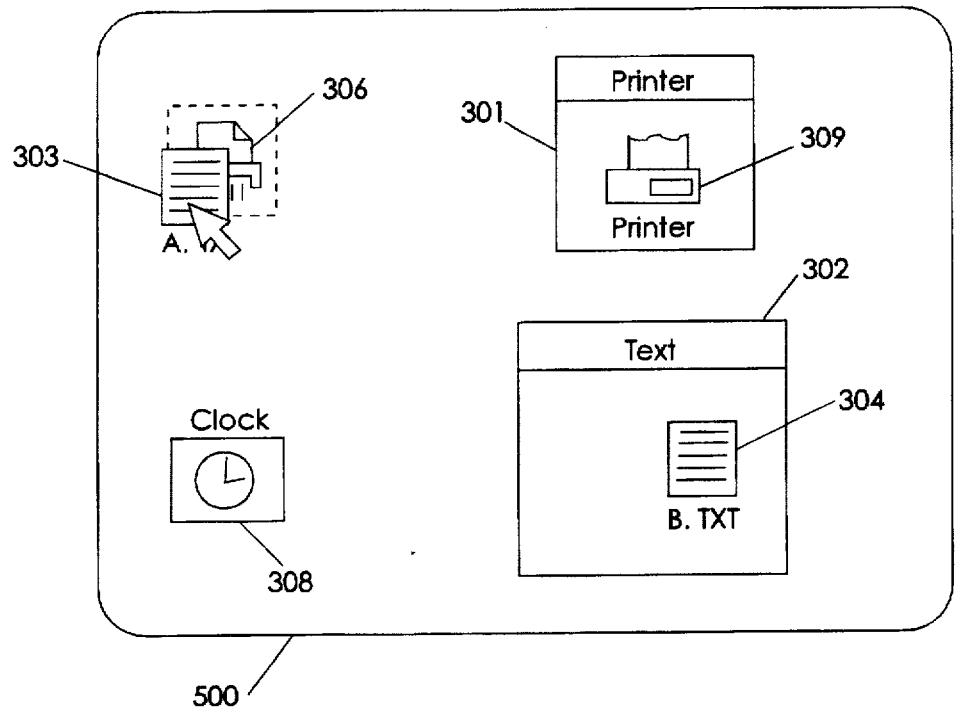
FIG. 5 illustrates an example of a drag and drop operation according to the present invention.

An operation in this invention which is similar to the operation described in FIGS. 3 to 5 is explained in sequence. That is, the operation to be performed is to "delete the text file A. TXT 303 using the shredder icon 306". The user first search the screen for the text file A. TXT 303 to be processed. Since the target text file A. TXT is displayed in the text window 302 in the lower right of the screen 600, the user moves the mouse pointer (an arrow) 310 onto the text file A. TXT so that the pointer partially overlaps the file. Dragging is initiated when the user presses a mouse button (usually the right button in OS/2) to fix the text file. FIG. 7 shows the screen immediately after the start of dragging.

This figure shows that the text file A. TXT 303 is displaced downward and rightward from a section 311 outlined by a broken line to show the area in which the text file was originally located because the text file has been dragged and somewhat moved. In response to the start of dragging, a clock window 305 that was located in the upper left of FIG. 6 is no longer displayed on a screen 700, whereas the shredder icon 306 that was hidden behind the clock window 305 is displayed in the area in which the clock window was displayed prior to the dragging, as shown in FIG. 7. Thus, the user then moves the text file A. TXT 303 being dragged to the shredder icon 306 and drops it thereon to complete the desired processing of "deleting the text file A. TXT 303 using the shredder icon 306". Finally, in this invention, all the processing is completed when the screen 700 is returned to the state prior to the start of the above sequence of operations, that is, the screen 600 in FIG. 6 with only the text file A. TXT 303 removed.

D. APIs for OS/2

Modifications to the API functions which are required to implement this invention are described below.

The operating system such as OS/2 which supports the multiwindow environment has its own application program interfaces (APIs). The APIs are contained in the kernel of OS/2 or a dynamic link library (DLL) module. The method for invoking the API for OS/2 is defined as follows: all the API parameters are placed on a stack, and a CALL FAR instruction is used to pass control to API service routines.

For convenience, the APIs for OS/2 are divided into several categories according to services they provide. The prefix of the name of a function within an API indicates the category of the APIs for OS/2 to which the function belongs. Main categories of the APIs for OS/2 are listed in Table 1.

TABLE 1

| Category | Name of API | Function |
| --- | --- | --- |
| DOS (base) | DosXXX | Multitasking, interprocess communication, memory management, files, exception processing |
| KBD (base) | KbdXXX | Logical keyboard management |
| VIO (base) | VioXXX | Logical video management |
| MOU (base) | MouXXX | Logical mouse management |
| WIN (PM) | WinXXX | Window management and I/Os |
| GPI (PM) | GpiXXX | Graphic display |
| DRG (PM) | DrgXXX | Direct manipulations |

Referencing Table 1, it is shown that for example, window management and I/Os are executed by APIs in the category WIN. This category further contains various functions such as WinGetMsg (getting a message) and WinDispatchMsg (dispatching a message). Among these API categories, there is a category for a "direct manipulation" function called DRG including functions to which modifications need be made in this invention.

E. Modifications to the DrgDrag function

One of the above API categories called DRG includes a function called DrgDrag to which this invention is directed. The DrgDrag function processes "drag" operations by a pointing device such as a mouse.

Figure 8:
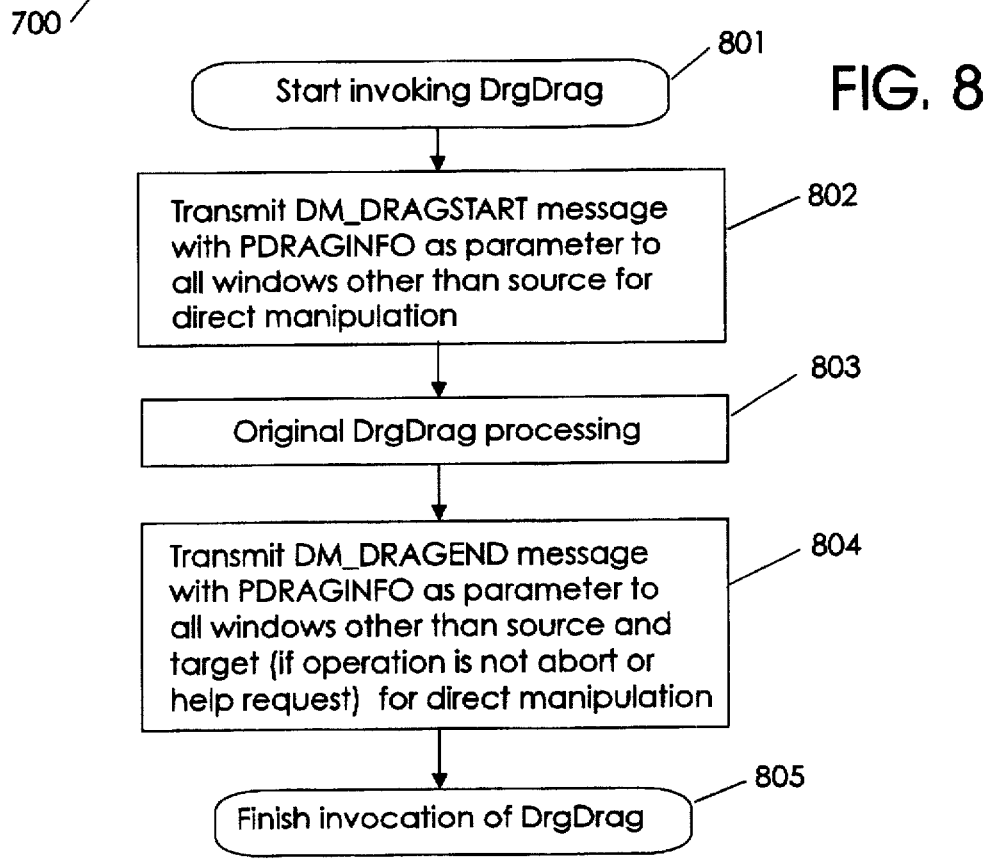
FIG. 8 is a flow chart of extended processing in a presentation manager according to the present invention.

For the purpose of this invention, an extended processing shown in FIG. 8 is added before and after the DrgDrag function process.

Referencing FIG. 8, at step 801, invocation of the DrgDrag function is initiated by a window containing a source icon to be processed in response to the start of the direct manipulation (dragging) of the icon by the user using a mouse. At step 802, in response to the start of the direct manipulation, a DM_DRAGSTART message having as a parameter a PDRAGINFO pointer with attribute information on the source icon is sent to the windows other than those containing the source icon. Next, at step 803, the original processing by the Drg Drag function is performed. At step 804, a DM_DRAGEND message having a PDRAGINFO pointer as a parameter is sent to other windows that do not contain the source icon directly operated and a target icon that processes the source icon. As shown in FIG. 8, the two functions, that is, the transmission of the DM_DRAGSTART message in response to the start of a direct manipulation and the transmission of the DM_DRAGEND message in response to the end of the direct manipulation must be added to the DrgDrag function.

F. Modifications to the window procedure

The window procedure in each application that receives the DM_DRAGSTART and DM_DRAGEND messages require processings for the two messages, as described below.

Figure 9:
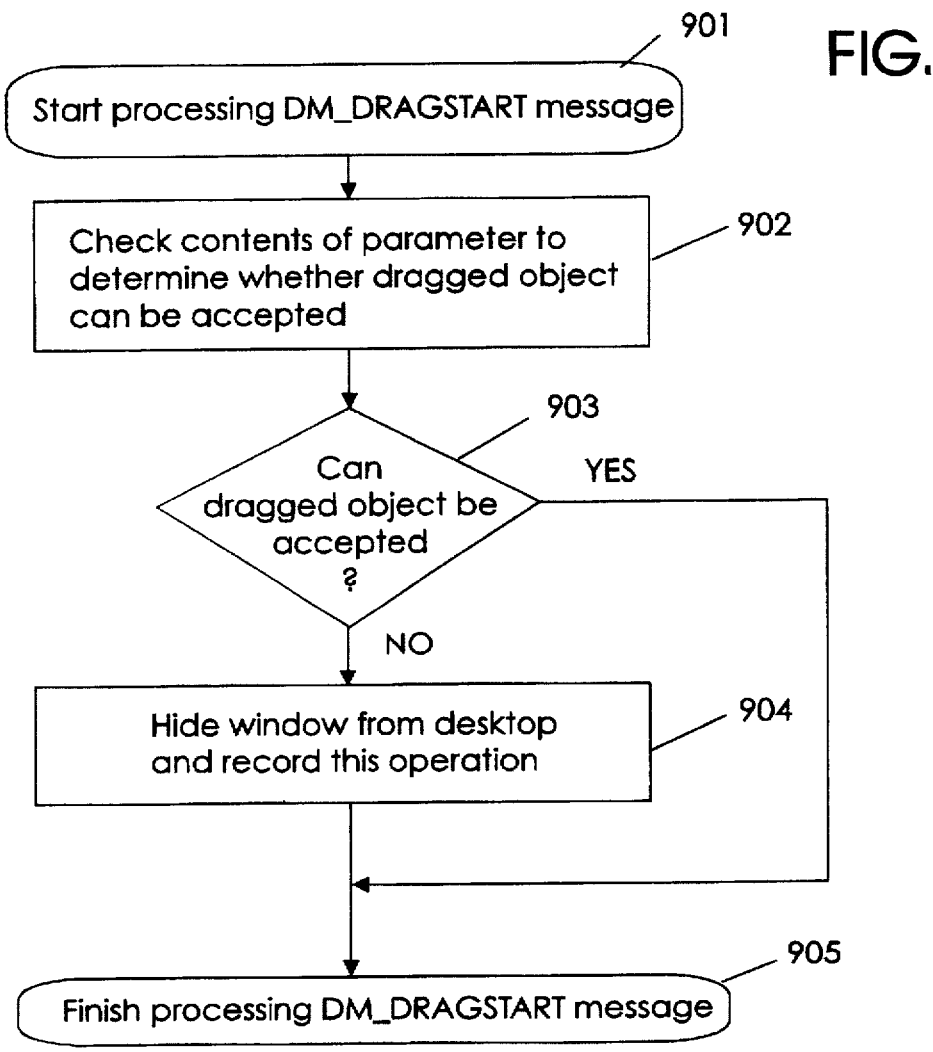
FIG. 9 is a flow chart of processing a DM_DRAGSTART message according to the present invention.

Referencing FIG. 9, at step 901, processing for DM_DRAGSTART message is started in response to the reception of this message. At step 902, the contents of the transmitted parameter, that is, the attribute information on the source icon is checked to determine whether or not the source icon can be processed. At step 903, if the result of the determination in step 902 is affirmative, the process proceeds to step 905, while otherwise, the process proceeds to step 904. At step 904, the window that cannot accept the source icon is "hidden" from the display screen and this processing is stored. "Hidden" in this context refers to indicating as the result of step 903 whether or not each icon can be accepted in a form that can be understood by the user, and thus includes operation such as "deleting the window from the screen" as described above or "expressing the window as a dot" that will be described with reference to FIGS. 13 and 14. Finally, at step 905, the processing for the DM_DRAGSTART message is finished.

Figure 10:
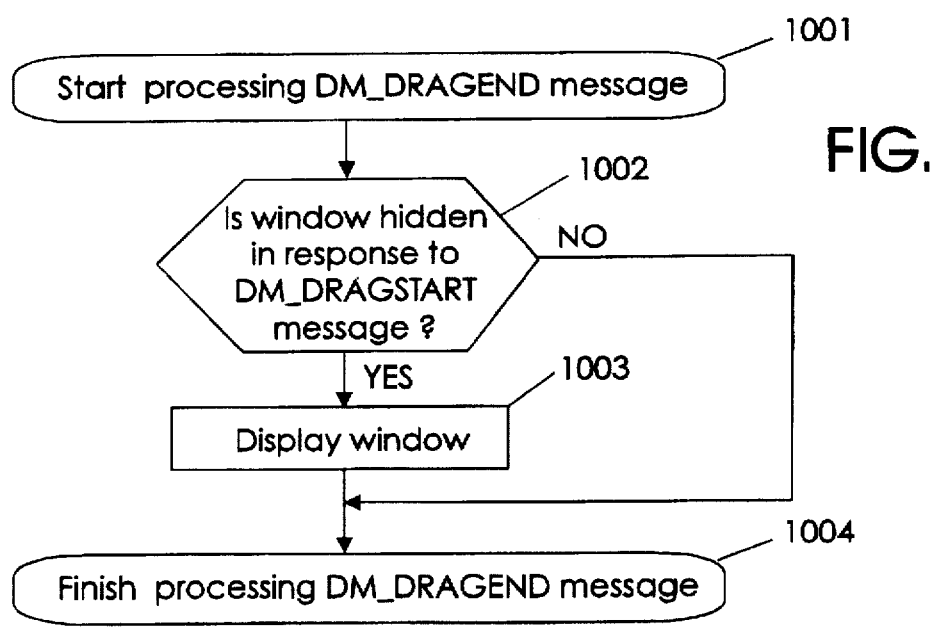
FIG. 10 is a flow chart of processing a DM_DRAGEND message according to the present invention.

Referencing FIG. 10, at step 1001, the processing for the DM_DRAGEND message is initiated. At step 1002, the window determines whether or not it is "hidden" in response to the DM_DRAGSTART message. If the window determines that it is not hidden, the process proceeds to step 1004, while if it determines that it is hidden, it displays itself on the screen. At step 1004, the processing for the DM_DRAGEND message is finished.

G. Embodiment 2

A second embodiment is described with reference to FIGS. 11 and 12.

Figure 11:
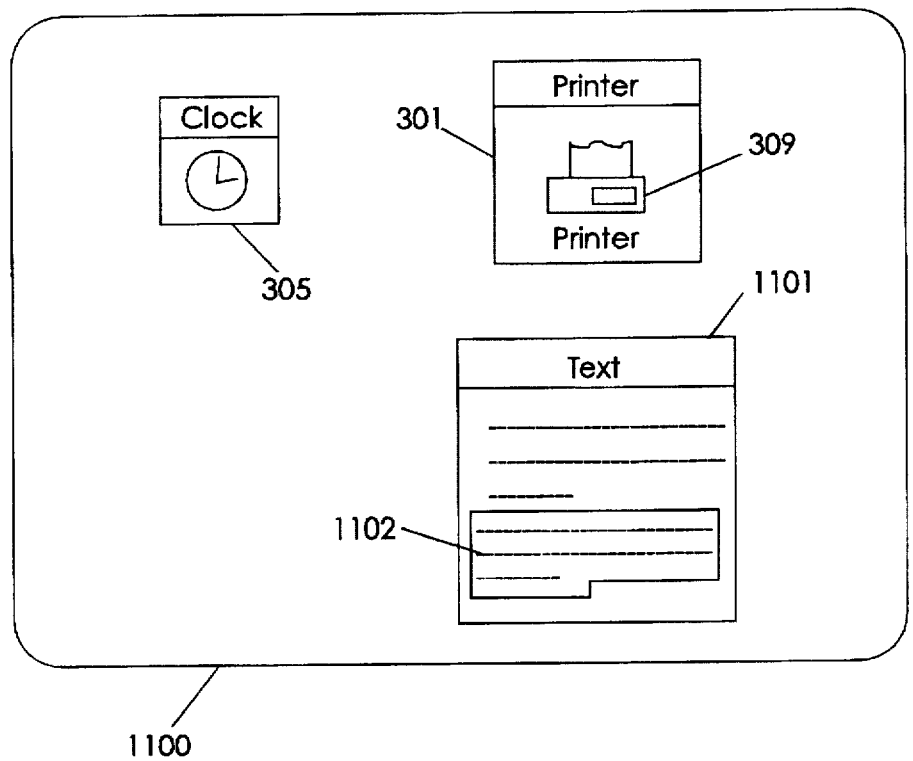
FIG. 11 illustrates an example of a drag and drop operation according to a second embodiment of the present invention.
Figure 12:
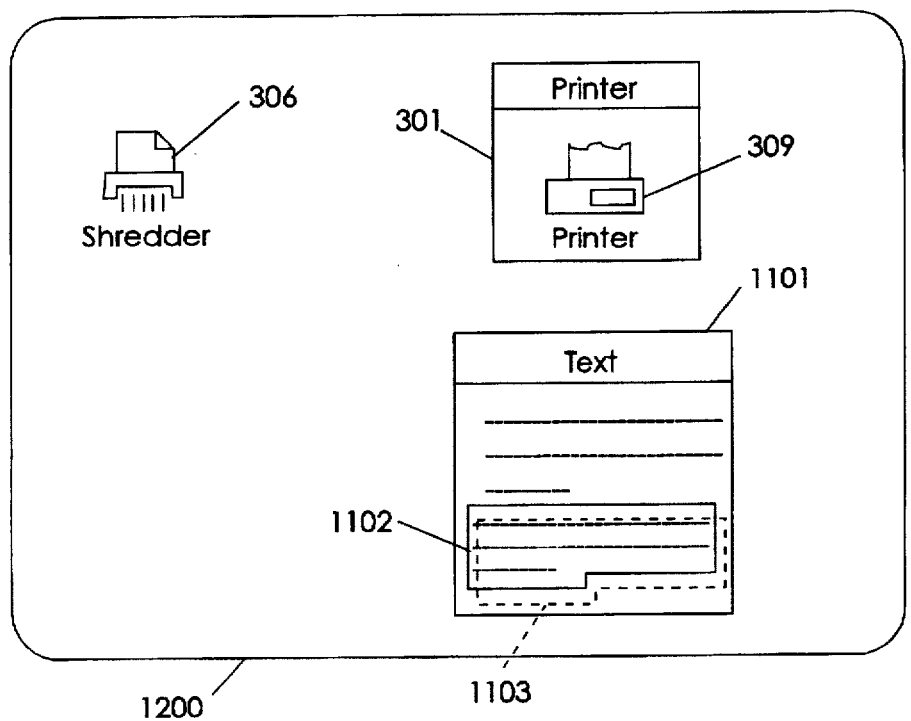
FIG. 12 illustrates a second example of a drag and drop operation according to a second embodiment of the present invention.

Referencing FIG. 11, three windows 301, 305, and 1101 are shown in a screen 1100. The windows 301 and 305 are the same as those in the first embodiment in FIG. 6, whereas a window 1101 is not included in FIG. 6. That is, in the first embodiment, the source to be processed is the object icon 303 representing a file, whereas in the second embodiment described in FIG. 11, the source is part of a text 1102 (a shaded part). The text window 1101 displays part of the target text (characters are represented by dashes for simplification). Assume an operation of "cutting and removing part of the text using the shredder icon". First, that part of the text displayed within the text window 1101 which is to be deleted is selected. The selected part 1102 is shaded. The user then starts dragging the selected part of the text using the mouse. FIG. 12 shows the screen immediately after the start of the dragging. In FIG. 12, the area in which the selected part of the text was originally located is expressed as a section 1103 outlined by dashed lines.

The user subsequently completes the target processing by moving the selected part of the text 1102 onto the shredder icon 306 that has appeared from behind the clock window in response to the start of dragging.

The second embodiment shows that the source in this invention applies to not only an icon but also part of a text file.

H. Embodiment 3

Figure 13:
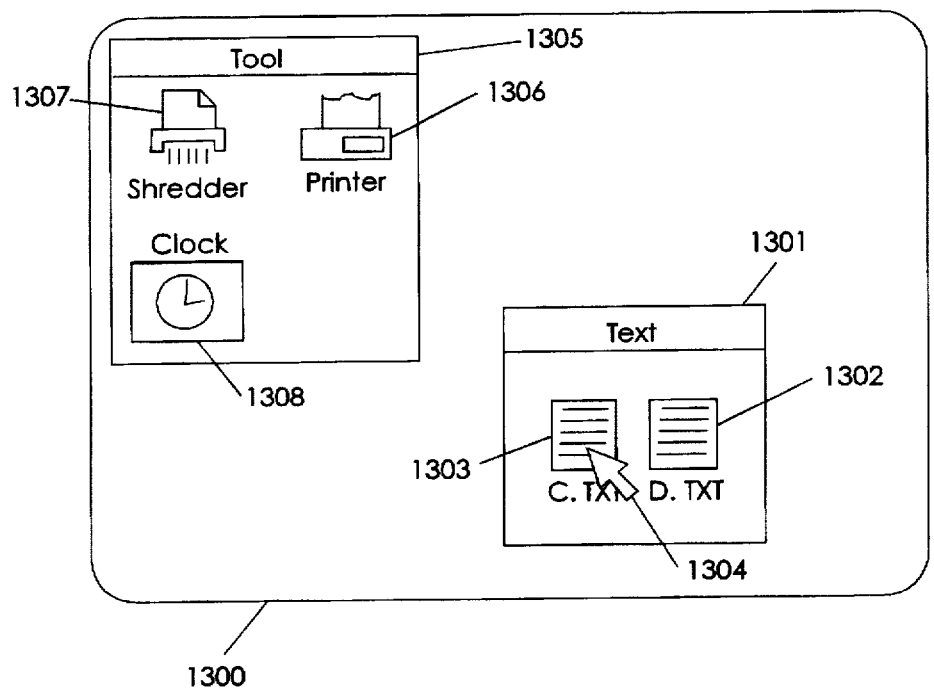
FIG. 13 illustrates an example of a drag and drop operation according to a third embodiment of the present invention.
Figure 14:
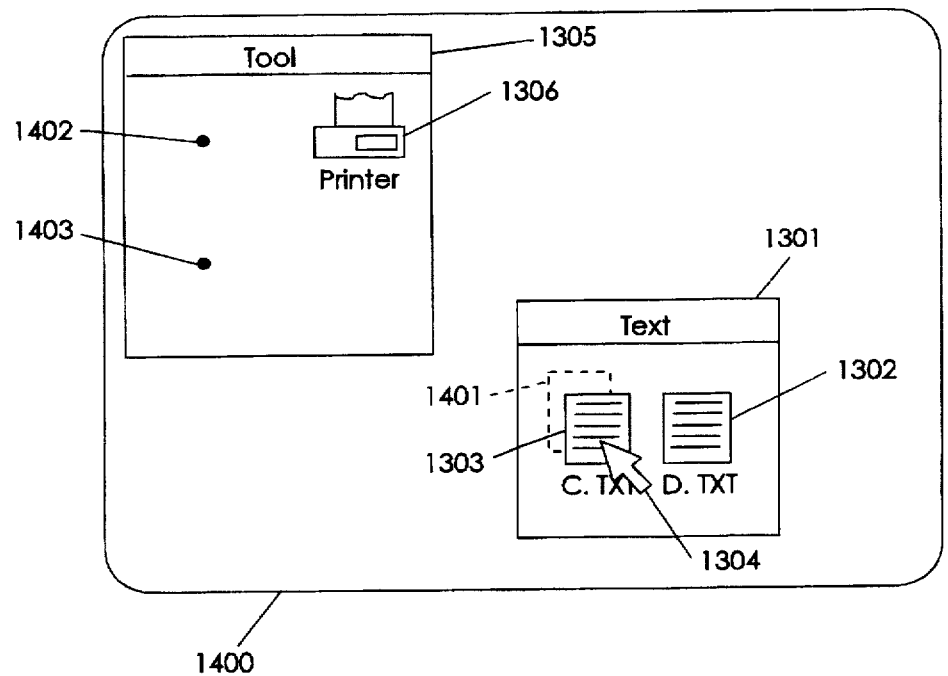
FIG. 14 illustrates a second example of a drag and drop operation according to a third embodiment of the present invention.

Referencing FIGS. 13 and 14, a third embodiment is described.

In the first and second embodiments, if the processing for a source object such as an icon or part of a text cannot be accepted, the corresponding window is removed from the screen. For example, in FIG. 6, the clock window is temporarily deleted from the screen instead of the clock icon. In the third embodiment, however, if the processing for the source object cannot be accepted, the corresponding icon is deleted instead of the corresponding window.

Referencing FIG. 13, a text window 1301 and a tool window 1305 containing a shredder, icon 1307, printer icon 1306, and clock icon 1308 similar to those in FIG. 6 are shown. Assume an operation of "printing a text file C. TXT using a printer icon". Assume also that the text file C. TXT has a deletion-prohibited attribute, that is, a read-only attribute.

The user first moves a cursor 1304 to the text file C. TXT that is the source object, thereby starting a dragging operation. FIG. 14 shows the screen immediately after the start of dragging. In FIG. 13, in response to the start of dragging, the shredder icon 1307 and the clock icon 1308 have disappeared from the screen, and dots 1402 and 1403 representing the shredder and the clock, respectively, are shown instead. That is, as described above, since the text file C. TXT that is the source object can only be read and is prohibited from deletion, the shredder icon 1307 that deletes texts determines from relevant attribute information that it cannot process the text file C. TXT, removes itself from the screen, and displays a dot expressing its presence instead. In addition, since the clock icon only has a function of displaying time on the screen as well as the text file, it determines like the shredder icon that it cannot process the text file and leaves itself as a dot on the screen. In this manner, by leaving an icon that cannot process the source object, as a dot in response to the start of dragging of the object, icons that can process the object and the source icon can be displayed without interference, and the user is aware of the presence of the icon that cannot process the object. Consequently, in the third embodiment, the user knows whether or not the shredder and clock icons can process the text file C. TXT that is the source icon, before starting dragging the source icon. In conventional processing, however, the user may forget that the text file C. TXT has a read-only attribute, or does not even know it. Even In such cases, displaying the shredder icon 1307 as the dot 1402 enables the user to notice before moving the source object to the shredder icon that this icon cannot accept the processing for the source file, thereby saving wasteful operations.

As described above, the configuration of this invention improves the usability and processing efficiency in user interfaces that use direct manipulations.

What is claimed is:

1. A method for displaying a screen on which drag and drop operation by object icons can be used, comprising the steps of:

in response to a user starting to drag at least one displayed icon, disabling the display of a window that cannot process the dragged icon; and, in response to the dragging of said dragged icon, enabling the display of a window that can process said dragged icon if the display of said window has been disabled.

2. A method for displaying a screen on which drag and drop operation by object icons can be used, comprising the steps of:

in response to a user starting to drag at least one displayed icon, transferring attribute information on the dragged icon from a window containing the dragged icon to other windows that do not contain the dragged icon;

determining based on said attribute information whether or not the windows to which said attribute information has been transferred can process said icon; and, disabling the display of a window that has been determined not to be able to process said dragged icon, and enabling the display of a window that has been determined to be able to process said dragged icon if the display of said window has been disabled.

3. The method as claimed in claim 2, further comprising the step of:

disabling the display of said dragged icon if the system has determined that no window is able to process said dragged icon.

4. The method as claimed in claim 2, further comprising the step of:

highlighting the display of said dragged icon if the system has determined that at least on window is able to process said dragged icon.

5. The method as claimed in claim 2, further comprising the step of:

returning the windows to the state prior to the start of said drag operation in response to the end of a drop operation on said dragged icon.

6. A computer system for displaying a screen on which drag and drop operations by object icons can be used, comprising:

means responsive to a user starting to drag at least one displayed icon for disabling the display of a window that cannot process the dragged icon; and, means responsive to the dragging of said dragged icon for enabling the display of a window that can process said dragged icon if the display of said window has been disabled.

7. A computer system for displaying a screen on which drag and drop operations by object icons can be used, comprising:

means responsive to a user starting to drag at least one displayed icon for transferring attribute information on the dragged icon from a window containing the dragged icon to other windows that do not contain the dragged icon;

means for determining based on said attribute information whether or not the windows to which said attribute information has been transferred can process said icon; and, means for disabling the display of a window that has been determined not to be able to process said dragged icon, and enabling the display of a window that has been determined to be able to process said dragged icon if the display of said window has been disabled.

8. The system as claimed in claim 7, further comprising:

means for returning the windows to the state prior to the start of said drag operation in response to the end of a drop operation on said dragged icon.

9. A method for displaying a screen on which direct manipulation operation on display objects can be used, comprising the steps of:

in response to a user starting to drag at least one display object, transferring attribute information on the dragged display object from a window containing the dragged display object to other windows that do not contain the dragged display object;

determining based on said attribute information whether or not the windows to which said attribute information has been transferred can process said dragged display object; and, indicating a window that has been determined to be able to process said dragged display object.

10. The method as claimed in claim 9, wherein said indicating step includes the steps of:

disabling the display of a window that has been determined not to be able to process said dragged display object; and, enabling the display of a window that has been determined to be able to process said dragged display object if the display of said window has been disabled.

11. The method as claimed in claim 9, wherein said indicating step includes the step of:

displaying in the foreground of said of said screen a window that has been determined to be able to process said dragged display object.

12. The method as claimed in claim 9, wherein said indicating step includes the step of:

disabling the display of said dragged display object if the system has determined that no window is able to process said dragged display object.

13. The method as claimed in claim 9, wherein said dragged display object is an object icon.

14. The method as claimed in claim 9, wherein said dragged display object is displayed text.

15. The method as claimed in claim 9, further comprising the step of:

returning the windows to the state prior to the start of said drag operation in response to the end of a drop operation on said dragged icon.

16. A computer system performing a direct manipulation operation on display objects displayed on a screen, which comprises:

means responsive to a user starting to drag at least one display object, for transferring attribute information on the dragged display object from a window containing the dragged display object to other windows that do not contain the dragged display object;

means for determining based on said attribute information whether or not the windows to which said attribute information has been transferred can process said dragged display object; and, means for indicating a window that has been determined to be able to process said dragged display object.

17. The system as claimed in claim 16, wherein said indicating means includes:

means for disabling the display of a window that has been determined not to be able to process said dragged display object; and, means for enabling the display of a window that has been determined to be able to process said dragged display object if the display of said window has been disabled.

18. The system as claimed in claim 16, wherein said indicating means includes:

means for displaying in the foreground of said of said screen a window that has been determined to be able to process said dragged display object.

19. The system as claimed in claim 16, wherein said indicating means includes:

means for disabling the display of said dragged display object if the system has determined that no window is able to process said dragged display object.

20. The system as claimed in claim 16, wherein said dragged display object is an object icon.

21. The system as claimed in claim 16, wherein said dragged display object is displayed text.

22. The method as claimed in claim 16, further comprising:

means for returning the windows to the state prior to the start of said drag operation in response to the end of a drop operation on said dragged display object.

* * * * *